(12) United States Patent
Roth (10) Patent No.: US 8,924,892 B2
(45) Date of Patent: Dec. 30, 2014

(54) MULTIPLE SELECTION ON DEVICES WITH MANY GESTURES

(75) Inventor: Volker Roth, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1198 days.

(21) Appl. No.: 12/202,066

(22) Filed: Aug. 29, 2008

(65) Prior Publication Data

US 2010/0050076 A1 Feb. 25, 2010

Related U.S. Application Data

(63) Continuation-in-part of application No. 12/197,224, filed on Aug. 22, 2008, now abandoned.

(51) Int. Cl.
*G06F 3/0488* (2013.01)

(52) U.S. Cl.
USPC .......................... 715/863; 715/702; 715/767

(58) Field of Classification Search
CPC ... G06F 3/017; G06F 3/0354; G06F 3/04883; G06F 3/0488; G06F 3/0486
USPC .......................................... 715/863, 702, 767
See application file for complete search history.

(56) References Cited

U.S. PATENT DOCUMENTS 7,164,410 B2 1/2007 Kupka
7,339,580 B2 * 3/2008 Westerman et al. .......... 345/173

FOREIGN PATENT DOCUMENTS

JP 2007-505371 3/2007
WO 2005/013052 A2 2/2005

OTHER PUBLICATIONS

Johnny Accot, et. al., More than dotting the I's—foundations for crossing-based interfaces. In Proc. CHI 2002, pp. 73-80, New York, NY, USA, 2002.ACM.
Georg Apitz, et. al., Crossy: a crossing-based drawing application. In UIST '04: Proceedings of the 17$^{th}$ annual ACM symposium on User interface software and technology, pp. 3-12, New York, NY, USA, 2004.ACM.
Patrick Baudisch, et. al., Drag-and-pop and drag-and-pick: Techniques for accessing remote screen content on touch-and pen-operated systems. In Matthias Rauterberg, Marino Menozzi, and Janet Wesson, editors, INTERACT. IOS Press, 2003.
Anastasia Bezerianos, et. al., The vacuum: facilitating the manipulation of distant objects. In Proc. CHI 2005, pp. 361-370, New York, NY, USA. 2005. ACM.
William Buxton, A three-state model of graphical input. In INTERACT '90: Proceedings of the IFIP TC13 Third Interational Conference on Human-Computer Interaction, pp. 449-456, Amsterdam, The Netherlands, The Netherlands, 1990. North-Holland Publishing Co.
Laurent Denoue, et. al., Cross-based UI for seamless note taking, marking and instant messaging. Invention Proposal FXPAL-IP-04-021, FX Palo Alto Laboratory, 3400 Hillview Ave. Building 4, Palo Alto, CA 94304, Mar. 2004.

(Continued)

*Primary Examiner* — Namitha Pillai
(74) *Attorney, Agent, or Firm* — Sughrue Mion, PLLC (57) ABSTRACT

Devices, methods and computer readable mediums storing a program causing a computer to execute a process for interacting with targets on a display, particularly in regards to devices utilizing a multi-touch display that are driven by gestures. The use of such devices, methods, and computer readable mediums storing a program allows the user to interact with devices through the use of multi-touch displays.

23 Claims, 7 Drawing Sheets

(56) References Cited

OTHER PUBLICATIONS

Jon Froehlich, et. al., Barrier pointing: using physical edges to assist target acquisition on mobile device touch screens. In Assets '07: Proceedings of the 9th International ACM SIGACCESS conference on Computers and accessibility, pp. 19-26, New York, NY, USA, 2007. ACM.

Jorg Geibler, Shuffle, throw or take it! Working efficiently with an interactive wall. In Proc. CHI 1998, pp. 265-266, New York, NY, USA. 1998. ACM.

Tovi Grossman, et. al., The bubble cursor: enhancing target acquisition by dynamic resizing of the cursor's activation area. In Proc. CHI 2005, pp. 281-290, New York, NY, USA, 2005.ACM.

Francois Guimbretiere, et. al., Benefits of merging command selection and direct manipulation. ACM Trans. Comput.-Hum, Interact., 12 (3): 460-476, 2005.

Francois Guimbretiere, et. al., Flowmenu: combining command, test, and data entry. In Proc. UIST 2000, pp. 213-216, New York, NY, USA, 2000.ACM.

M. Hascoet., Throwing models for large displays. In Proc. HCI 2003, vol. 2, pp. 73-77. British HCI Group, 2003.

Michael J. McGuffin, et. al., Fitts' law and expanding targets: Experimental studies and designs for user interfaces. ACM Trans. Comput.-Hum. Interact., 12 (4): 388-422, 2005.

M:metrics. Iphone hype holds up. Online at http://mmetrics.com/press/PressRelease.aspx? Article=Mar, 18, 2008—iphonehype, Mar. 2008.

Miguel A. Nacenta, et. al., A comparision of techniques for multi-display reaching. In Proc. CHI 2005, pp. 371-380, New York, NY, USA, 2005.ACM.

Stuart pook, et. al., Control menus: execution and control in a single interactor. In Proc. CHI 2000, pp. 263-264, New York, NY, USA, 2000.ACM.

Gonzalo A. Ramos, et. al., Pressure marks. In Proc. CHI 2007, pp. 1375-1384, New York, NY, USA, 2007.ACM.

Jun Rekimoto, Pick-and-drop: a direct manipulation technique for multiple computer environments. In proc. UIST 1997, pp. 31-39, New York, NY USA, 1997. ACM.

Jun Rekimoto, SyncTap: Synchronous user operation for spontaneous network connection. Personal Ubiquitous Comput., 8 (2): 126-134, 2004.

Xiangshi Ren, et. al., Improving selection performance on pen-based systems: a study of pen-based interaction for selection tasks. ACM. Trans. Comput.-Hum. Interact., 7 (3): 384-416, 2000.

Buntarou Shizuki, et. al., Laser pointer interaction techniques using peripheral areas of screens. In AVI '06: Proceedings of the working conference on Advanced visual interfaces, pp. 95-98, New York, NY, USA, 2006.ACM.

Daniel Vogel, et. al., Shift: a technique for operating pen-based interfaces using touch. In CHI ' 07: Proceedings of the SIGCHI conference on Human factors in computing systems, pp. 657-666, New York, NY, USA, 2007.ACM.

* cited by examiner

MULTIPLE SELECTION ON DEVICES WITH MANY GESTURES

CROSS REFERENCE TO RELATED APPLICATION

This application claims the benefit of priority of and is a continuation-in-part of U.S. application Ser. No. 12/197,224, by common inventor Volker ROTH, filed Aug. 22, 2008, and entitled "MULTIPLE SELECTION ON DEVICES WITH MANY GESTURES". Application Ser. No. 12/197,224 is fully incorporated herein by reference for all purposes.

FIELD OF THE INVENTION

This invention generally relates to devices, methods and computer readable mediums storing a program causing a computer to execute a process for interacting with targets on a display, particularly in regards to devices utilizing a multi-touch display that are driven by gestures.

BACKGROUND OF THE INVENTION

There has been renewed interest in finding novel ways to interact with devices through the use of multi-touch displays, particularly with mobile devices. Such interaction is driven by gestures. For instance, dragging is a gesture that can move a large view within a view port. This is useful to display documents that are too large for devices with small displays, such as a mobile device. Zooming can be performed by means of pinching gestures. A tap opens a selection or sets the zoom level such that the view port focuses on the tapped part of the document. However, with so many basic gestures being allocated already to essential and frequently needed interactions, multiple selection tasks become cumbersome.

Advances in mobile devices have allowed such devices to render web pages just like an ordinary browser. Users can navigate a large page with ease despite the device's constraint size using a set of simple and intuitive gestures. They can drag and flick a large page to position it within the display view port, pinch the display to zoom in and out of the viewed page or tap on page elements to center and scale the page to fit the view port.

We refer to these gestures as primary gestures, as they are used consistently in many applications, for instance photo browsing, map navigation, document reading and scrolling of data items organized in tables. The gestures and the functions they invoke are essential and defining interaction design principles of the device.

The downside is that these essential gestures are not easily available for other important, but less frequent, tasks. For instance, most WIMP systems implement dragging, dropping and multiple selection with the mouse equivalents of these gestures whereas scrolling and zooming is accomplished through interaction with special widgets (e.g., scroll bars) or additional hardware (e.g., a scroll wheel). Laptops with touch pads are an exception as they already support two finger gestures for scrolling.

While less frequent, filing and editing tasks are also of importance for mobile device applications. For instance, when attaching photos to an e-mail, the familiar photo browser is invoked. In order to select photos, the primary gestures must be redefined based on context, or additional input states must be synthesized. The first choice is a break of consistency and also makes the original functionality of the primary gesture unavailable (e.g., navigating within the photo collection by flicking, and enlarging a photo thumbnail by tapping on it). This has a detrimental effect on the user experience particularly if multiple selection is interspersed with navigation because the meanings of primary gestures change frequently and the change of mode requires additional interaction. The second choice may be difficult to accomplish or have limited usability. For instance, if timeouts are used to synthesize additional input states, then gestures in that state are penalized with a delay. This can be observed in application launchers where tapping and holding an application icon switches into a different mode that allows one to delete the icon or drag it to a different position. Fortunately, this is an infrequent operation and therefore the delay is tolerable. However, for more frequent operations, particularly operations that alternate with navigation tasks, the mode switching delay easily becomes intolerable.

Alternatively, a hardware mode switching button may be used. However, a hardware button is a costly resource. A virtual button, on the other hand, consumes valuable display real estate.

A crossing-based interface along the bounds of the display is a viable solution. Users can invoke actions with swiping gestures across a section of the display side from the outside to the inside. This approach requires minimal display real estate and a number of actions can co-exist conflict-free with primary gestures. We illustrate the concept below.

Crossing-based interfaces, such as the one described by Accot and Zhai in "More Than Dotting The I's—Foundations For Crossing-Based Interfaces", In *Proc. CHI* 2002, were suggested as an alternative interaction paradigm to pointing tasks. Crossing tasks also follow Fitt's Law (albeit with different parameters) and in some situations they can be more efficient than pointing tasks. Consider a button versus a line: in the button pointing task the cursor must land on the button and therefore the task time depends on the size of the button. There is no landing zone for the crossing task and therefore it can be faster e.g., if the line is perpendicular to the distance vector between the line and the cursor. Another advantage is that a well positioned line requires significantly less display space than a button for similar performance characteristics.

Pointing and crossing tasks were compared, and as a proof of concept of the crossing interaction principle, Apitz and Guimbretiere in "Crossy: A Crossing-Based Drawing Application", *UIST'04: Proceedings of the 17$^{th}$ Annual ACM Symposium On User Interface Software And Technology*, built a sketching tool entirely comprised of crossing widgets. Crossing-based interaction has also been used in the design of interactive menus such as FlowMenu, as described by Guimbretiere and Winograd in "Flowmenu: Combining Command, Text, and Data Entry." *In Proc. UIST* 2000, and Control Menu, as described by Pook et al., in "Control Menus: Execution And Control In A Single Interactor." In *Proc. CHI* 2000.

In "Laser Pointer Interaction Techniques Using Peripheral Areas Of Screens.", In *AVI'06: Proceedings Of The Working Conference On Advanced Visual Interfaces*, Shizuki et al. describe a crossing-based interaction technique that allows a user to control tasks or applications such as a slide presentation or a simple drawing tool with a laser pointer. For instance, a swipe from the right outside of the slide to the inside selects the next slide. The movement of the laser pointer with respect with the slide projection is tracked using a camera.

Froehlich et al. in "Barrier Pointing: Using Physical Edges To Assist Target Acquisition On Mobile Device Touch Screens." In *Assets '07: Proceedings Of The 9th International ACM SIGACCESS Conference on Computers and Accessibility* describe a technique they call barrier pointing, which relies on physical elevated edges around the device display to aid to positioning tasks. Selection targets are positioned along the elevated display edges and corners such that the physical edges can be used as stabilizing guides. Selections are confirmed e.g., by lifting a stylus while it is within the target's boundaries.

SUMMARY OF THE INVENTION

Aspects of the present invention provide a device, method and a computer readable medium storing a program causing a computer to execute a process for interacting with targets on a display, particularly in regards to devices utilizing a multi-touch display that are driven by many gestures. According to further aspects of the present invention, the interactions are suitable for mobile devices with touch-sensitive screens and can co-exist conflict-free with primary gestures while requiring minimal display space.

Aspects of the present invention further provide a display with at least one activation point disposed near or on the edge of the display, with each activation point representing a desired action. Each the desired actions are then inputted into the device through the use of a gesture between an activation point representing the desired action and a target on the display through the use of a gesture. The gesture may comprise a tactile interaction with the display and may also begin from the activation point representing the desired action in order to utilize an action to target paradigm, in contrast to the ordinary target to action paradigm. One example of such a gesture is a continuous swiping motion from the activation point representing a desired action or even from the bezel of the device, through the activation point and to the target on the display. Such a gesture allows the active area of an activation point to be much smaller on a display due to the utilization of a greater average weight throughout a touch sensitive display, which creates a higher probability of activating on a narrow activation point or operating on a small target. This further operates to save valuable display space on the screen, since the activation point can be made smaller on the display as a result. In comparison, a tapping gesture attempts to hit a particular target and will suffer from a higher error rate as a result. The continuous swiping motion may also begin from outside the display for ease of use.

Aspects of the present invention further provide, but are not limited to, interactions which support seamless text annotation, tagging and selection on mobile devices with touch screens, and multiple selection, attachment, cut, copy and paste for multimedia object collections, enlarging objects and drag-and-area-move actions.

In some aspects of the invention, visual feedback is generated to trace the gesture between the bar representing the desired action and a target on the display. The visual feedback may be in the form of a rubber band figure that utilizes elongating movement that stretches and shrinks as a result of the gesture. The utilization of visual feedback also allows for the connecting and highlighting of potential targets as a result of the gesture.

In some aspects of the invention, a marker is placed on the target after the gesture ends, with the marker being a representation of the desired action. Such markers may include, for example, a text marker that when placed on a text target, will highlight or select text. Other examples include an attach marker which allows the user to attach targets to a newly created e-mail.

In some aspects of the invention, desired actions can be cancelled by swiping out of the display area without interrupting the gesture, or by the utilization of an undo function.

In some aspects of the invention, the bars may utilize patterns or other color-independent markings to assist color blind users.

In one exemplary aspect of the invention, multiple markers may be utilized with multiple gestures to execute a desired action in tandem. For example, a user may utilize a gesture from the bar representing a text select action to a target text in order to select desired text. A text marker is subsequently placed at the target after the gesture ends. Then the user can subsequently place a copy marker through the user of a gesture from the bar representing the copy action to the end of the desired text area. Upon ending the gesture, the copy action can then be invoked to copy text from the text select marker to the copy marker.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawings, in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

First, a basic illustration of how primary gestures are typically used on mobile devices will be described.

Figure 1:
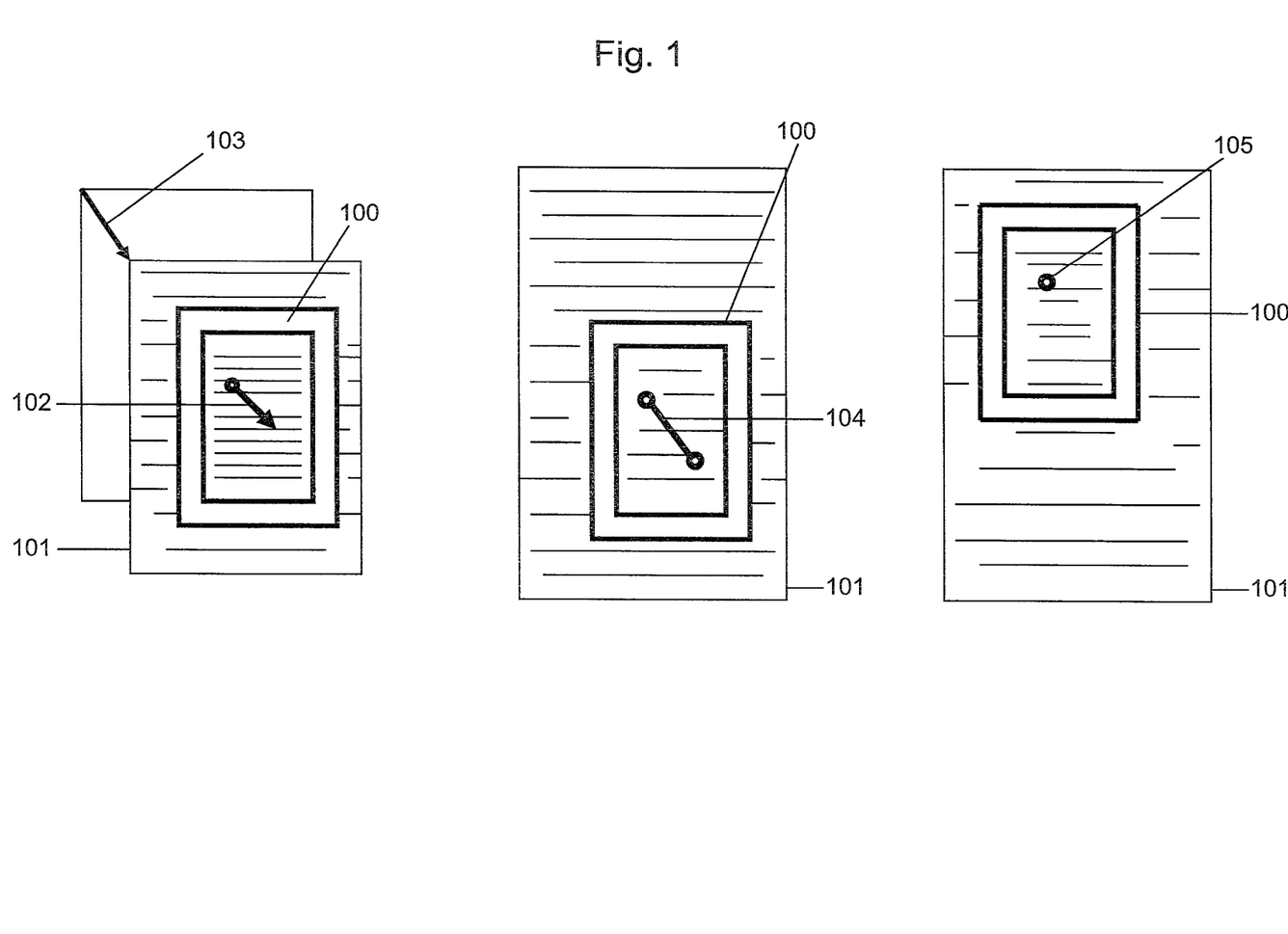
FIG. 1 is an explanatory diagrams which illustrates primary gestures on a mobile device and the limitations such devices have without the present invention.

FIG. 1 is an explanatory diagram which illustrates primary gestures on a mobile device and the limitations such devices have without the present invention.

In FIG. 1, we illustrate a display of a typical mobile device. Suppose, for example, the user loads a web page that is too big to render on the display 100. Typical mobile devices allow the user, therefore, to utilize a swiping motion 102 on the display to reposition the view of the page from one place to another 103. The mobile devices also allow one to do a pinching motion 104 on the display to zoom in and out of the viewed page 101 or tap on page elements to center and scale the page to fit the view port. However, such usage makes these types of gestures unavailable for other important, but less frequent, tasks. Thus, if the present invention is combined with the reserved gestures of the typical mobile device, the present invention further allows for the users to utilize gestures to do other tasks without interrupting the original functionality of the typical mobile device.

Figure 2A:
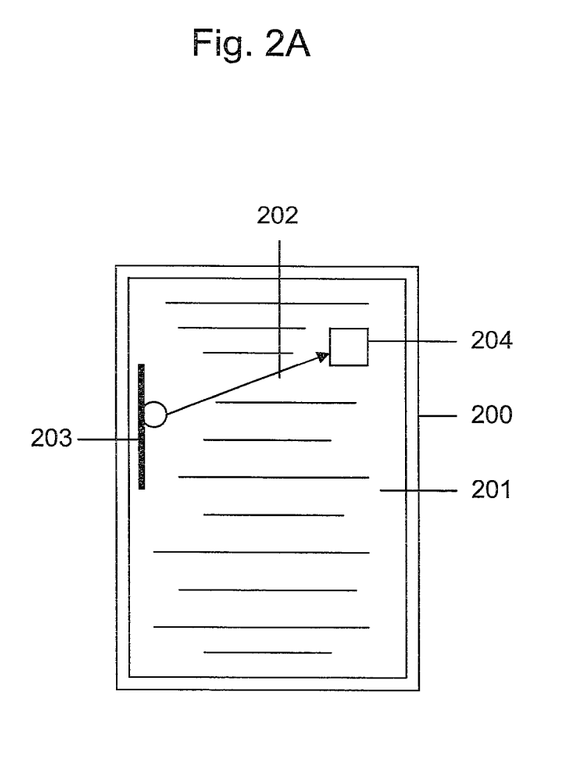
FIG. 2A and FIG. 2B illustrate how interactions with targets on a display can be handled according to aspects of the present invention.
Figure 2B:
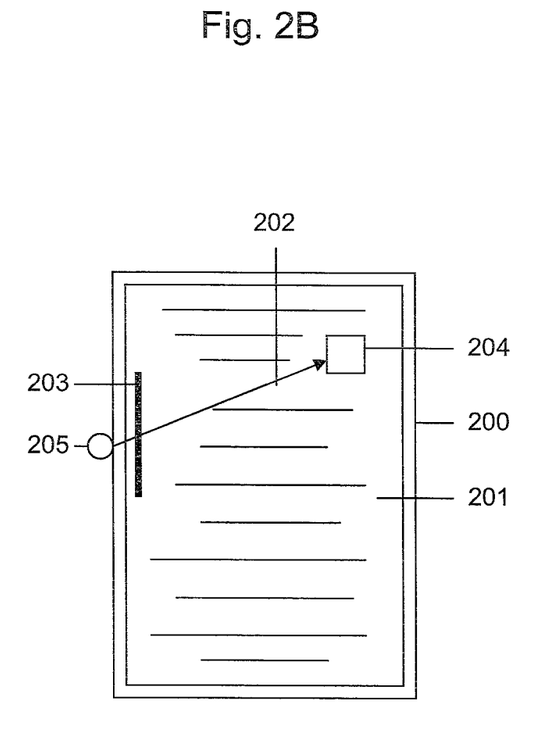

FIG. 2A and FIG. 2B illustrate how interactions with targets on a display can be handled according to aspects of the present invention.

In FIG. 2A, we present a basic embodiment of the present invention which allows the user to do an alternate task on a typical mobile device. Suppose the user is viewing a page 201 and wishes to select a target 204 such as a picture in order to select it. In a typical mobile device, tapping on the target would not select the target because the taping gesture is reserved for centering and scaling. To avoid this problem, the present invention provides an activation point 203 (represented as a bar in this example) displayed on the edge of the screen which represents the desired action of selecting. The bar is made small so as to not take up valuable space on the display. The user can then select the target 204 through the use of a gesture 202, such as swiping, pinching, tapping or other gestures, between the bar representing the desired action and the target. Once the gesture is completed, the action will be implemented on the target, which in this case, will select the target. In implementing a bar that represents a desired action, the issues of conflicting with primary gestures is avoided since the user can simply do the gesture without involving the bar to invoke the original functionality of the typical mobile device.

Of course, the present invention is not limited to merely having a singular bar representing an action. Several such bars may be dispersed around the edges of the screen so as to allow the user access to several different desired actions. These bars may be color coded to represent different actions, or the bars may utilize patterns or other color-independent markings to assist color blind users. Furthermore, the shape of the activation point is not limited to a bar-like shape; other shapes such as a dot, circle, star, gap or so forth may be used to represent the edge portion. However, a bar is preferred because it can be placed at the edge of the display without occupying too much space, and its position can be clearly noted. The activation point can be also printed or engraved on a bezel alongside the display. Also, since the activation point merely needs to receive a tactile interaction in order to activate, the activation point does not have to be displayed or even be visible; for example, by notifying the user of the position in the display which initiates the desired action from a edge gesture in an instruction manual or such, users can utilize the present invention without requiring the activation point to be explicitly displayed.

Furthermore, the present invention is also not limited to merely having a select action. Other actions are also possible, such as, but not limited to, seamless text annotation, tagging and selection, multiple selections for attachment to other objects such as e-mails, cut, copy and paste for multimedia object collections, enlarging objects and drag-and-area-move actions.

In FIG. 2B, we present an embodiment that demonstrates the action to target paradigm of the present invention. The user can begin his gesture from either on the bar itself or from outside the display 205 and continue the gesture through the bar and to target as if the user were bringing the action to the target. An example of such a gesture is if the user utilized a continuous swiping motion with his finger from the bar representing a desired action to the target on the display. When the gesture ends, such as by lifting up the finger, the desired action is then executed onto the target. Furthermore, desired actions can also be cancelled by swiping out of the display area without interrupting the gesture, thereby preventing the action from going to the target, or by the utilization of an undo function.

Figure 3:
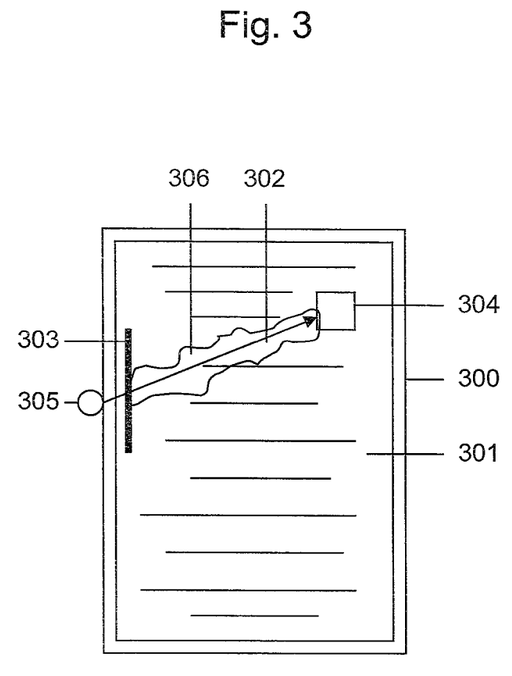
FIG. 3 illustrates an embodiment of the present invention where visual feedback is provided to trace the gesture.

FIG. 3 illustrates an embodiment of the present invention where visual feedback is provided to trace the gesture.

Visual feedback may also generated to trace the gesture between the bar representing the desired action and a target on the display. For example, in FIG. 3, the visual feedback used is in the form of a rubber band FIG. 306 that utilizes elongating movement that stretches and shrinks as a result of the gesture. Of course, the visual feedback does not need to be in the form of a rubber band but may be any kind of visual feedback in reaction to the gesture. Other visualizations and techniques can be applied to indicate to the user that the action has been activated and what area is affected by the gesture, such as target expansion, callouts, or other forms of highlighting. The utilization of visual feedback would also allow for the connecting and highlighting of potential targets covered by the visual feedback as a result of the gesture by highlighting potential targets in the area affected by the gesture or traced by the visual feedback.

Figure 4:
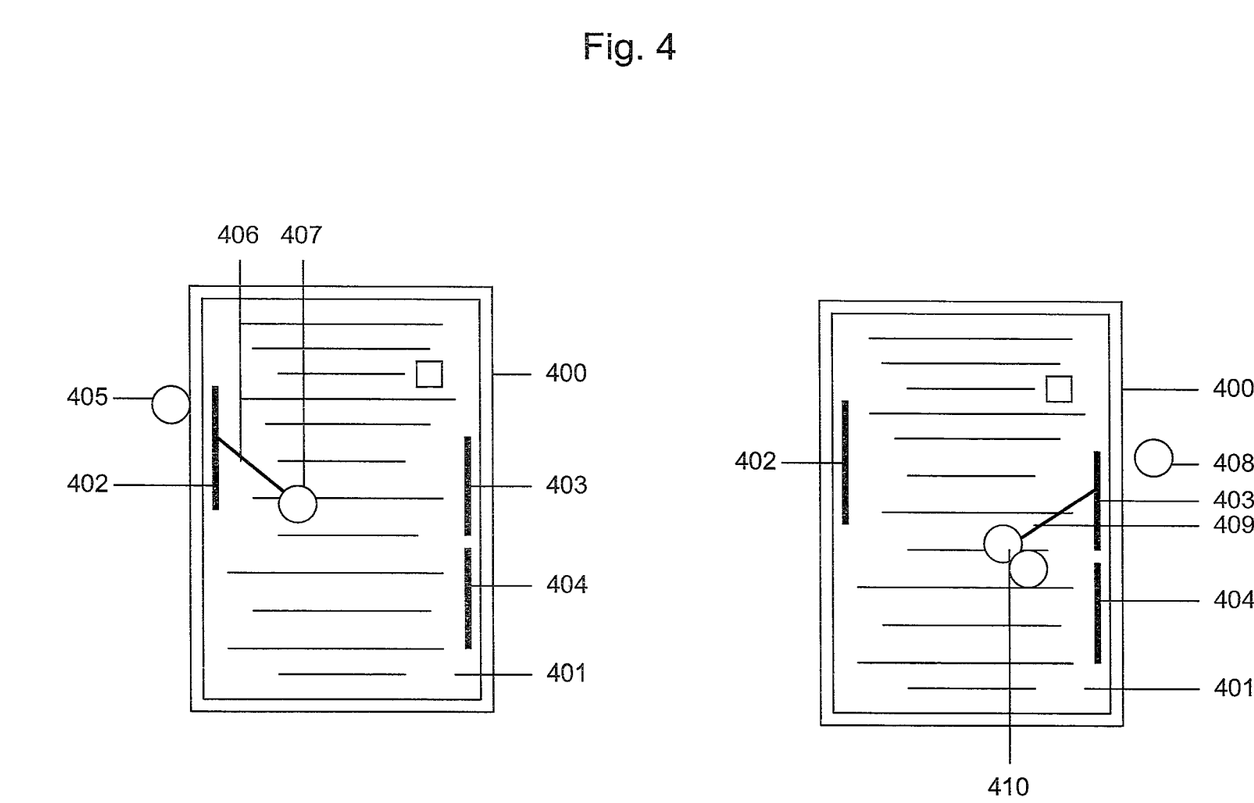
FIG. 4 illustrates several embodiments of the invention, including the placing of markers and using multiple markers in conjunction with multiple gestures to execute a desired action in tandem.

FIG. 4 illustrates several embodiments of the invention, including the placing of markers and using multiple markers in conjunction with multiple gestures to execute a desired action in tandem.

In FIG. 4, we demonstrate several different embodiments of the invention, including the use of multiple bars, multiple gestures, and the placing of markers to indicate a desired action. The placing of a marker is useful in utilizing multiple gestures with multiple bars to execute a desired action in tandem. For example, a user may utilize a gesture 406 from the bar representing a text select action 402 to a target text in order to select desired text. A text marker 407 is subsequently placed at the target after the gesture ends. Then the user can subsequently place a copy marker 410 through the user of a gesture 409 from the bar representing the copy action 403 to the end of the desired text area. Upon ending the gesture, the copy action can then be invoked to copy text from the text select marker to the copy marker. Of course, other actions are also possible through the utilization of markers in tandem with multiple gestures, such as copy and paste, or attaching targets to e-mails.

Another embodiment to the present invention is an action command combining a reserved gesture and a gesture initiated by sliding from the activation point to the target on the display. Some reserved gestures are designed to be executed in a consecutive manner. For example, a starting point and an end point must be selected when selecting a range of objects. If the touch is released without defining the end point after touching the starting point, typical mobile devices are often designed to cancel the original command. However, by utilizing a gesture involving the activation point, the action can be implemented independently from the reserved gesture and interpose between the consecutive pointing of the reserved gesture. Hence, the user initiates the reserved gesture, in this case "range selection", by tapping an editing menu or through a specific gesture stroke, and selects a start point of the range. If the desired end point is not displayed on the screen due to the narrow display area, the user would then start a stroke from the activation point to initiate the edge-sliding gesture. The processing unit of the device detects the stroke and identifies the desired action as selecting a position for an end point, and thus maintains the previously ordered command (i.e. range selection), and keeps the position of the start point. While the user slides and seeks the desired end point on the screen, visual feedback is drawn on the screen to show the path of the gesture. After the user selects the end point and releases the touch, the position data of the released point is integrated into the range selection command and used as the end point. Thus, the range selection process can be processed using the data obtained from the edge-slide gesture. Of course, even if the reserved command requires a plural touch of more than two consecutive gestures, the mixed action of a reserved action and an edge-sliding gesture can also be implemented.

Figure 5:
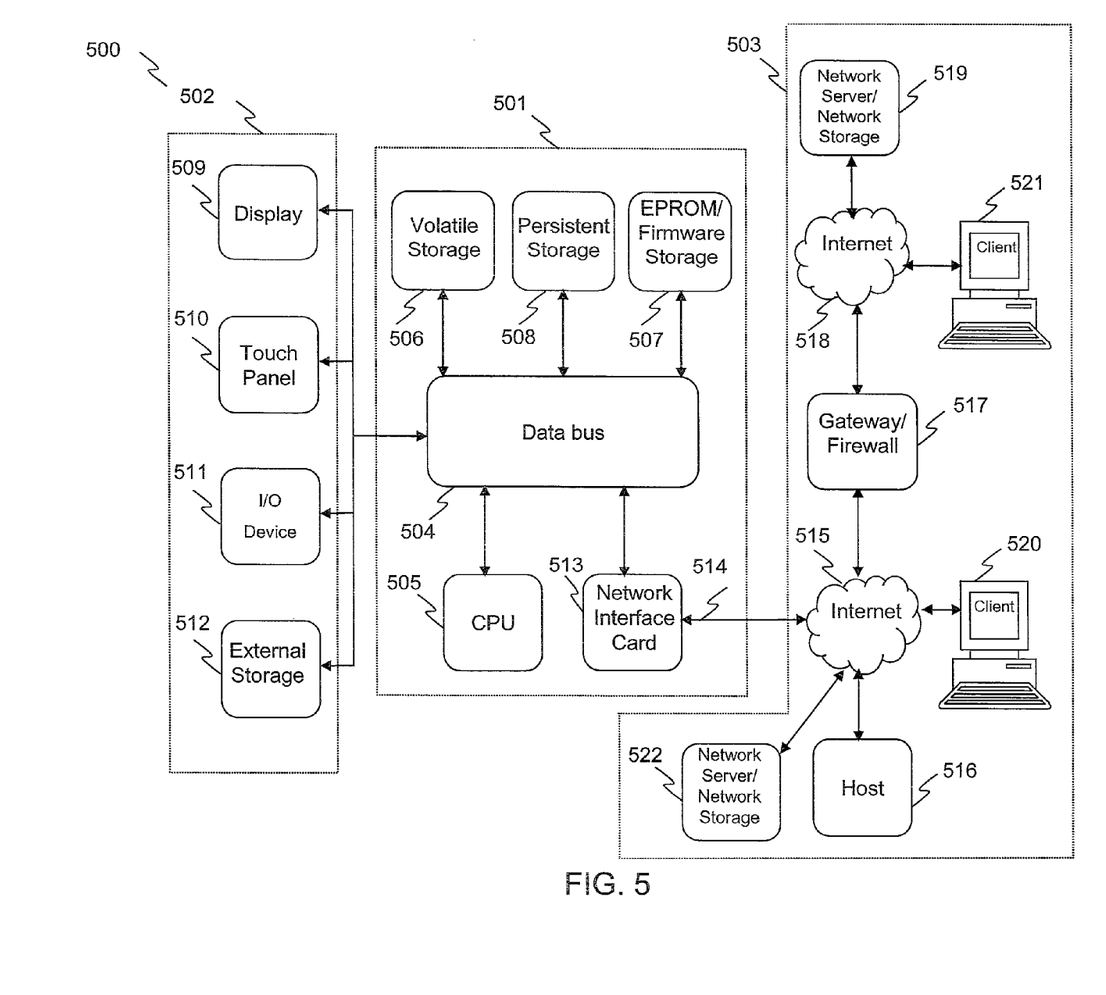
FIG. 5 illustrates an exemplary embodiment of a computer platform upon which the inventive system may be implemented.

FIG. 5 is a block diagram that illustrates an embodiment of a computer/server system 500 upon which an embodiment of the inventive methodology may be implemented. The system 500 includes a computer/server platform 501, peripheral devices 502 and network resources 503.

The computer platform 501 relates to devices, particularly mobile devices, that utilize a touch panel. Examples of well known devices may include, but are not limited to, cell phones, personal digital assistants ("PDA"), personal computers with touch panels, laptops, hand-held devices and various other similar devices. The computer platform 501 may include a data bus 504 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 504 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 504 to a display 509, such as a cathode ray tube (CRT), plasma display, or a liquid crystal display (LCD), for displaying information to a system administrator or user of the computer platform 501. A touch panel 510, is coupled to bus 501 and is used as the primary means for communicating information and command selections to processor 505, to allow for the display to be used as a touch display. Other I/O devices 511, such as buttons, keyboard, mouse or trackball and various other similar devices, may also be coupled for communicating information and command selections to the processor 505.

An external storage device 512 may be connected to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 508. Volatile media includes dynamic memory, such as volatile storage 506. Transmission media includes coaxial cables, copper wire and fiber optics, including the wires that comprise data bus 504. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is connected to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 514 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 514 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution. In this manner, computer system 501 may obtain application code in the form of a carrier wave.

Figure 6:
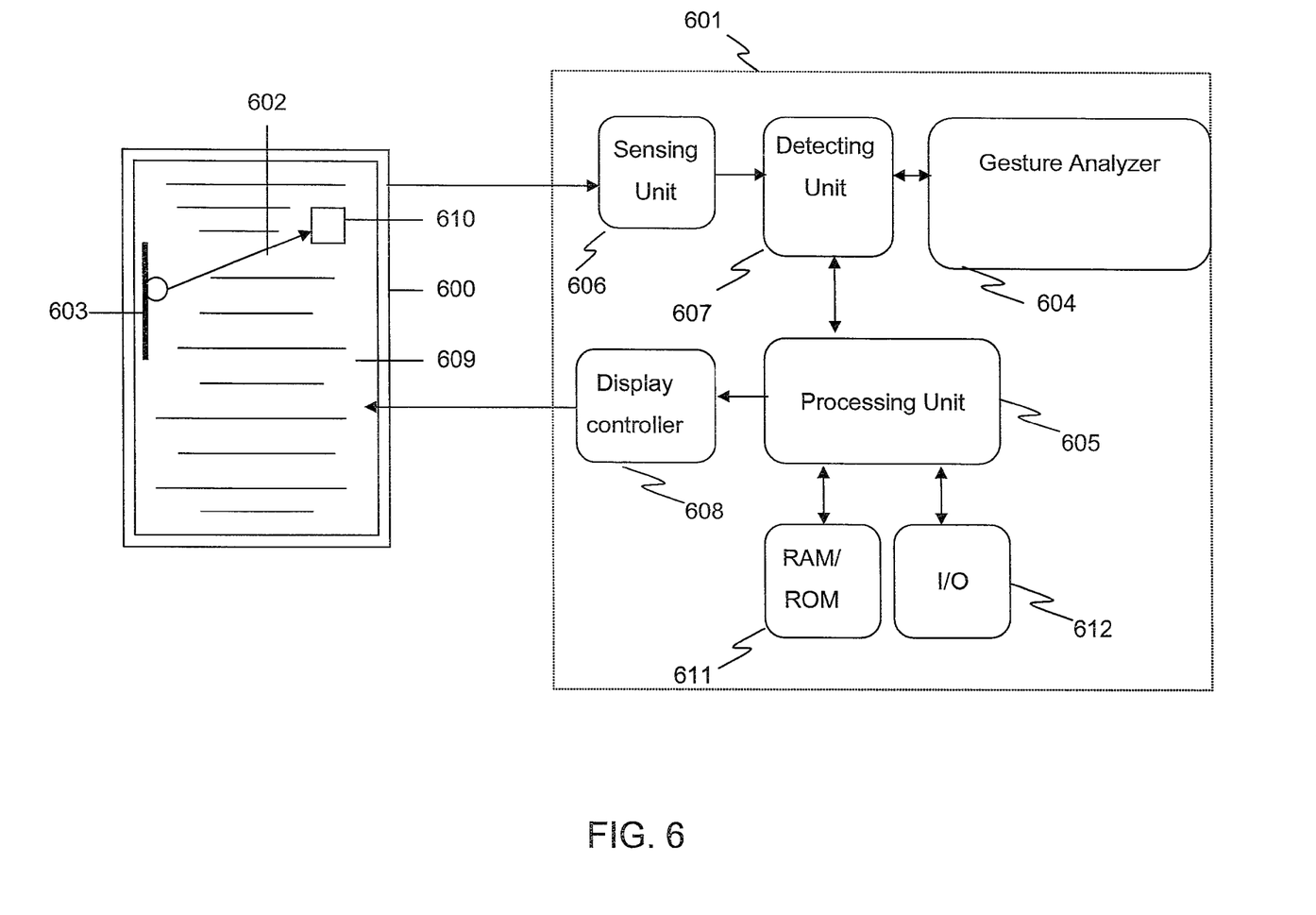
FIG. 6 illustrates an example functional diagram of how the present invention relates to the computer platform.

FIG. 6 illustrates an example functional diagram of how the present invention relates to the computer platform.

We present an example of how a basic embodiment of the present invention allows the user to do an alternate task on a typical mobile device, the example computer platform being used, and an example as to how it relates to the computer platform. When the user utilizes a tactile interaction on the device, the tactile interaction is received by the touch display 600 containing a sensing unit 606. The sensing unit senses the tactile interaction to the display along with the coordinates as to where the tactile interaction occurred. This information is then sent to a detection unit 607 which processes the information through a gesture analyzer 604 which compares the information to gestures stored in memory and determining the action that corresponds to the gesture. For example, if the tactile interaction is a reserved gesture, such as tap, drag and rotate, the detecting unit forwards the action to the processing unit 605, and the processing unit subsequently processes the originally defined action. If the gesture is started from the edge portion of the display while activating a mark representing a desired action, the detecting unit forwards the action to the processing unit, whereby the processing unit 605 controls the display controller 608 to display visual feedback from the edge portion to the current tapping positions. If the user thereby implements the action by ceasing the gesture at a desired target, the processor unit 605 will process the action when the touch on the display is released. Furthermore, if the user inputs a mixed action by using a reserved gesture that requires a continuous plural touch on the display, but then interrupts the plural touch by activating a mark, the processor unit 605 will process a part of the action of the reserved gesture and also receives a positional signal corresponding to the release point at the mark and then restarts the reserved action using the received positional signal. The processing unit thereby completes each process with regard to the reserved or selected action, such as displaying, editing and communicating and so forth.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the invention. It is intended that the specification and examples be considered as exemplary only, with a true scope and spirit of the invention being indicated by the following claims and their equivalents.

What is claimed is:

1. A device, comprising:
   a display;
   a sensing unit sensing a tactile interaction at least on the display;
   an activation point near an edge of the display, the activation point identifying a predetermined command in accordance with a position of the activation point on the display, and the activation point not being explicitly displayed;
   a detecting unit, detecting a reserved gesture not starting from the activation point and a gesture starting from the activation point representing the predetermined command corresponding to the tactile interaction on the display, wherein the reserved gesture not starting from the activation point, and the gesture starting from the activation point are differentiated; and a processing unit, processing a command based on the detected gesture, wherein the processing unit executes a reserved command corresponding to the reserved gesture when the detecting unit detects the reserved gesture and wherein the processing unit executes the predetermined command represented by the gesture starting from the activation point, when the detecting unit detects the gesture starting from the activation point.

2. The device in claim 1, wherein the reserved gesture further comprises a continuous plural touch on the display;

and wherein the detecting unit further detects another gesture at the activation point intervening with the plural touch; and, wherein the processing unit uses a position at end of the another gesture for processing the reserved command based on the reserved gesture.

3. The device in claim 1, further comprising a display controller, wherein the display controller generates visual feedback to trace a gesture between the activation point identifying the predetermined command and inner portion of the display.

4. The device in claim 3, further comprising a marker placed on the inner portion by the display controller after the gesture has ended; wherein the marker is a representation of the command.

5. The device in claim 3, wherein the visual feedback comprises displaying a rubber band figure from the activation point to the inner portion of the display; wherein the rubber band figure stretches and shrinks in reaction to the gesture.

6. The device in claim 5, wherein the visual feedback connects and highlights potential targets as a result of the gesture.

7. The device in claim 1, wherein the activation point is on a bezel alongside the display.

8. The device in claim 1, wherein the gesture starting from the activation point ends at a predetermined inner location on the display 9. A method of interacting with targets on a display, comprising:

providing an activation point near an edge of the display, wherein the activation point identifies a predetermined command in accordance with a position of the activation point on the display, and the activation point is not explicitly displayed;

sensing a tactile interaction at least on the display;

detecting a reserved gesture not starting from the activation point and a gesture starting from the activation point representing the predetermined command corresponding to the tactile interaction on the display, wherein the reserved gesture not starting from the activation point, and the gesture starting from the activation point are differentiated; and processing a command based on the detected gesture, wherein a reserved command corresponding to the reserved gesture is executed when the reserved gesture is detected, and wherein the predetermined command represented by the gesture starting from the activation point is executed, when the gesture starting from the activation point is detected.

10. The method in claim 9, wherein the gesture originates from either outside the display or from the activation point.

11. The method in claim 9, further comprising generating visual feedback to trace the gesture between the activation point identifying the predetermined command and an inner portion of the display.

12. The method in claim 11, wherein the generating visual feedback further comprises displaying a rubber band figure from the activation point to the inner portion of the display, wherein the rubber band figure stretches and shrinks in reaction to the gesture.

13. The method in claim 9, further comprising placing a marker on an inner portion of the display; wherein the marker is a representation of the command.

14. The method in claim 9, further comprising highlighting potential targets as a result of the gesture.

15. The method in claim 9, wherein the gesture starting from the activation point ends at a predetermined inner location on the display.

16. A non-transitory computer readable medium storing a program causing a computer to execute a process for interacting with a display, the process comprising:

providing an activation point near edge of a display, wherein of the activation point identifies a predetermined command in accordance with a position of the activation point on the display, and the activation point is not explicitly displayed;

sensing a tactile interaction at least on the display;

detecting a reserved gesture not starting from the activation point and a gesture starting from the activation point representing the predetermined command corresponding to the tactile interaction on the display, wherein the reserved gesture not starting from the activation point, and the gesture starting from the activation point are differentiated; and processing a command based on the detected gesture, wherein a reserved command corresponding to the reserved gesture is executed when the reserved gesture is detected, and wherein the predetermined command represented by the gesture starting from the activation point is executed, and when the gesture starting from the activation point is detected.

17. The non-transitory computer readable medium in claim 16, further comprising generating visual feedback to trace the gesture between the activation point identifying the predetermined command and an inner portion of the display.

18. The non-transitory computer readable medium in claim 17, further comprising displaying a rubber band figure from the activation point to the inner portion of the display, wherein the rubber band figure stretches and shrinks in reaction to the gesture.

19. The non-transitory computer readable medium in claim 17, further comprising highlighting potential targets as a result of the gesture.

20. The non-transitory computer readable medium in claim 16, further comprising placing a marker on an inner portion of the display; wherein the marker is a representation of the command.

21. The non-transitory computer readable medium in claim 16, wherein the gesture starting from the activation point ends at a predetermined inner location on the display.

22. A device, comprising:

a sensing unit sensing a tactile interaction on a display, the display having a perimeter, and activation point identifying a predetermined command in accordance with a position of the activation point on the display and disposed near the perimeter of the display, the activation point not being explicitly displayed, and an inner portion within the perimeter, and activation the predetermined command represented by the activation point in response to sensing the tactile interaction on the activation point;

a detecting unit, detecting a reserved gesture not starting from the activation point and a gesture starting from the activation point representing the predetermined command corresponding to the tactile interaction on the display, wherein the reserved gesture not starting from the activation point, and the gesture starting from the activation point are differentiated;

a processing unit, executing a command based on the detected gesture, wherein the processing unit executes a reserved command corresponding to the reserved gesture when the detecting unit detects the reserved gesture, and wherein the processing unit executes the predetermined command represented by the gesture starting from the activation point when the detecting unit detects the gesture starting from the activation point.

23. The device in claim 22, wherein the gesture starting from the activation point ends at a predetermined inner location on the display.

\* \* \* \* \*

UNITED STATES PATENT AND TRADEMARK OFFICE
CERTIFICATE OF CORRECTION

PATENT NO.        : 8,924,892 B2  
APPLICATION NO.   : 12/202066  
DATED             : December 30, 2014  
INVENTOR(S)       : Volker Roth Page 1 of 1

It is certified that error appears in the above-identified patent and that said Letters Patent is hereby corrected as shown below:

In the claims

Col. 11, line 25, after "and" insert --an--.

Col. 12, line 21, after "near" insert --an--.

Col. 12, line 21, delete "a" and insert --the--.

Col. 12, line 22, delete "of".

Col. 12, line 39, delete "and".

Col. 12, line 67, delete "activation" and insert --activating--.

Signed and Sealed this
Fifth Day of April, 2016

Michelle K. Lee
*Director of the United States Patent and Trademark Office*